US008718473B2

(12) United States Patent
Zhang et al.

(10) Patent No.: US 8,718,473 B2
(45) Date of Patent: May 6, 2014

(54) EFFICIENT MAC PROTOCOL FOR OFDMA PASSIVE OPTICAL NETWORKS (PONS)

(75) Inventors: Jingjing Zhang, Princeton, NJ (US); Ting Wang, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 423 days.

(21) Appl. No.: 13/270,209

(22) Filed: Oct. 10, 2011

(65) Prior Publication Data

US 2012/0087664 A1    Apr. 12, 2012

Related U.S. Application Data

(60) Provisional application No. 61/391,836, filed on Oct. 11, 2010.

(51) Int. Cl.
*H04J 14/02*    (2006.01)
(52) U.S. Cl.
USPC ............................................................ 398/72
(58) Field of Classification Search
USPC ..................................................... 398/66–73
See application file for complete search history.

(56) References Cited

U.S. PATENT DOCUMENTS

2004/0095884 A1* 5/2004 Lee et al. ...................... 370/235
2007/0140288 A1* 6/2007 Boyd et al. .................... 370/442

OTHER PUBLICATIONS

W. Wei, T. Wang, D. Qiari, and J. Hu, "MAC Protocols for Optical Orthogonal Frequency Division Multiple Access (OFDMA)-based Passive Optical Networks," Optical Fiber communication/National Fiber Optic Engineers Conference, 2008.
M.P. McGarry, M. Reisslein, C.J. Colbourn, M. Maier, F. Aurzada, and M. Scheutzow, "Just-in-time scheduling for multichannel EPONs," Journal of Lightwave Technology, vol. 26, No. 10, pp. 1204-1216, 2008.

* cited by examiner

*Primary Examiner* — Leslie Pascal
(74) *Attorney, Agent, or Firm* — Joseph Kolodka

(57) ABSTRACT

Systems and methods are disclosed for providing media access control (MAC) in an optical network by providing a separate control channel and data channel; dedicating each optical network unit (ONU) with one control channel, wherein the control message is transmitted at any time without constraints; sending a grant message to an ONU just before an allocated time is about to start; and sending data traffic from the ONU immediately after receiving the grant message without synchronizing with an optical line terminal (OLT) clock.

20 Claims, 3 Drawing Sheets (1) ONU keeps updating its queue status
(2) OLT sends out grant message just before the time starts
(3) ONU transmits upon receiving grants on the subcarriers for the time duration specified in grant message (1) ONU keeps updating its queue status
(2) OLT sends out grant message just before the time starts
(3) ONU transmits upon receiving grants on the subcarriers for the time duration specified in grant message

EFFICIENT MAC PROTOCOL FOR OFDMA PASSIVE OPTICAL NETWORKS (PONS)

The present application claims priority to Provisional Application Ser. No. 61/391,836, filed Oct. 11, 2010, the content of which is incorporated by reference.

BACKGROUND

The invention relates to a MAC protocol for OFDMA PONs.

Synchronizing with optical line terminals (OLTs) is a basic requirement of optical network units (ONUs) in time division multiplexing (TDM) passive optical networks (PONs), where ONUs transmit their data traffic over the time slots allocated by OLT so as to avoid data collision. The synchronization need, on one hand, implies implementing a sophisticated clock synchronization system in ONUs. On the other hand, the non-negligible synchronization time may result in extra packet delay, reduced bandwidth utilization, and possibly some unnecessary energy consumption.

In one optical system with OFDMA PON uses OFDMA as its modulation and access scheme. OFDMA PON divides the upstream/downstream bandwidth in baseband into multiple subcarriers with orthogonal frequencies. These subcarriers are dynamically allocated to different ONUs based on their real-time incoming traffic information. As compared to TDM PON and WDM PON, OFDMA PON enjoys numerous advantages such as high speed transmission, fine granularity bandwidth allocation, and color-free ONUs. To eliminate the synchronization need in OFDMA PON, one way is to dedicate subcarriers for each ONU. Then, ONUs can transmit any time they want on their respective dedicated subcarriers. This scheme is similar to the transmission in WDM PONs where each ONU is dedicated with one or more wavelengths. However, no statistical multiplexing gain can be exploited among traffic of ONUs.

SUMMARY

In one aspect systems and methods are disclosed for providing media access control (MAC) in an optical network by providing a separate control channel and data channel; dedicating each optical network unit (ONU) with one control channel, wherein the control message is transmitted at any time without constraints; sending a grant message to an ONU just before an allocated time is about to start; and sending data traffic from the ONU immediately after receiving the grant message without synchronizing with an optical line terminal (OLT) clock.

Advantages of the preferred embodiments may include one or more of the following. The system can eliminate the need for synchronization at the ONU side, thus simplifying the ONU structure and reducing the ONU cost. The system yields small packet delay since the ONU traffic can be immediately reported to ONU upon arrival, and OLT always have the most recent queue information of ONUs. Traffic statistical multiplexing gain can be exploited since OFDMA subcarriers except those dedicated for control channels are dynamically assigned to ONUs according to their real-time traffic. The elimination of synchronization needs of ONUs can greatly simplify the ONU structure, and further leverages the advantages of OFDMA PON over TDM PON and WDM PON.

DESCRIPTION

Figure 1:
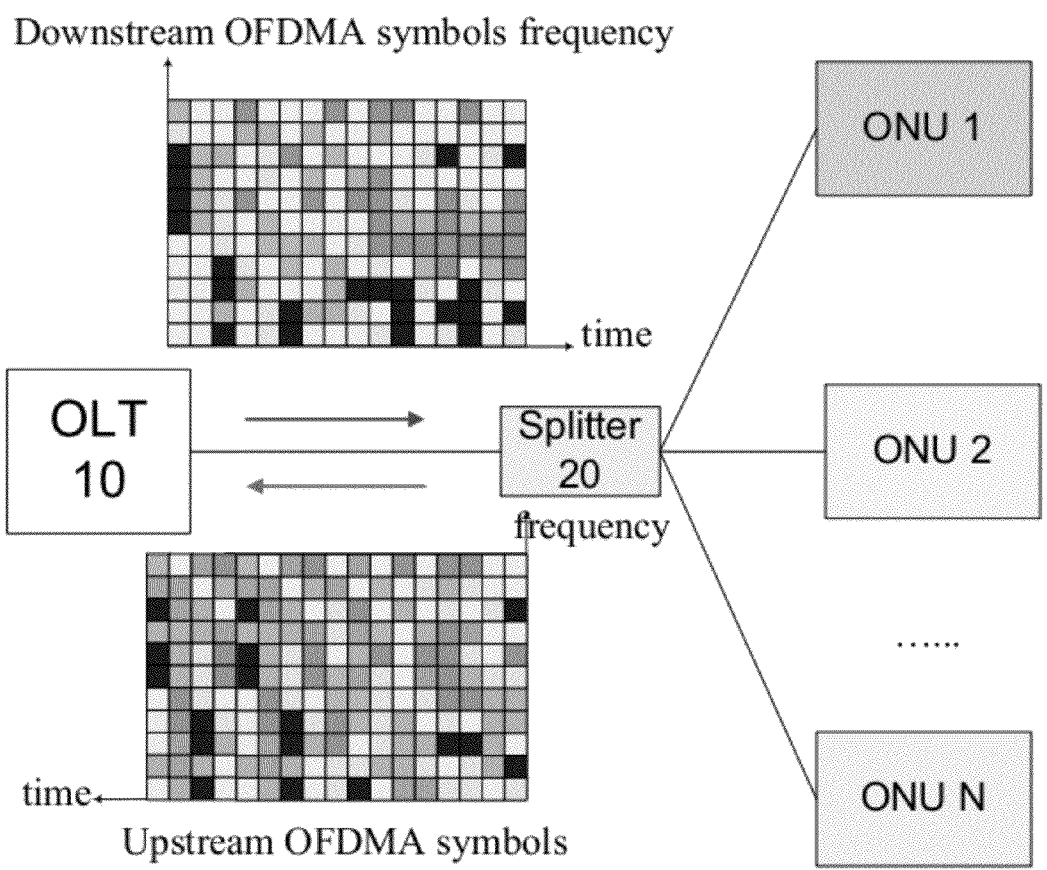
FIG. 1 shows an exemplary OFDMA PON system.

FIG. 1 shows an exemplary OFDMA PON architecture. The system of FIG. 1 supports communication between OLT 10 and ONUs 1-N through splitter 20. In the system of FIG. 1, upstream/downstream data traffic is transmitted over one wavelength channel, which is further divided into OFDM subcarriers. Each OFDMA subcarrier can be allocated to different ONUs 1-N in different time slots. To avoid collision in accessing upstream OFDMA subcarriers, proper control schemes are used to coordinate data transmissions of ONUs 1-N.

In Scheme 1, the current MAC protocols of TDM PONs are adapted to an OFDMA PON. Basically, TDM PONs including EPON and GPON employ the following upstream bandwidth control scheme: ONUs report their queue length information to OLT using the time slot specified by OLT; OLT allocates time slots in a frame/cycle to ONUs and notifies ONUs with its decisions; ONUs transmit their data traffic over time slots allocated by OLT. With this scheme, all subcarriers are shared among all ONUs. Thus, statistical multiplexing gain among traffic of ONUs can be exploited. However, ONUs need to synchronize with OLT.

In Scheme 2, the system divides all OFDMA subcarriers into multiple non-overlapping sets, each of which is fixedly allocated to an ONU. Since no sharing of OFDMA subcarriers exists among different ONUs, ONUs can send their traffic over the dedicated subcarriers any time they want without getting collision. The communication between OLT and an ONU can be actually regarded as a point-to-point system. The elimination of synchronization need, MAC control protocols, and sophisticated inter-ONU bandwidth arbitration algorithms simplifies the ONU structure, and thus reducing the ONU cost. However, low bandwidth utilization and therefore low network performance will be resulted due to the failure of exploiting statistical multiplexing gain. The low bandwidth utilization problem is not negligible particularly in PONs where the ONU traffic exhibits bursty and strong self-similarity which is characteristics of many user applications such as variable bit rate video.

To eliminate the synchronization need and also exploit the traffic statistical gain, a third MAC control protocol can be used.

Similar to Scheme 1, ONUs report its traffic information to OLT, and OLT allocates subcarriers to ONUs based on the real-time ONU reports.

Similar to Scheme 2, each ONU is dedicated with upstream/downstream OFDMA subcarriers. However, these dedicated OFDMA subcarriers are used for control message transmission only.

OLT sends out the grant message to an ONU right before the allocated time begins, i.e., the grant is sent out at time $t-RTT_i$, where t is the beginning time of the allocation to ONU i, and $RTT_i$ refers to the round trip time between OLT and ONU i. The grant message contains the allocated subcarriers and the time duration on each allocated subcarriers.

Upon receiving grants sent from OLT, an ONU immediately starts its data transmission on the allocated subcarriers for the time duration specified in the grant message.

Taking advantages of the abundance of OFDMA subcarriers, the third MAC protocol for OFDMA PON enables the asynchronous property of ONUs but also exploits the statistical multiplexing gain of ONU traffic. The protocol is uniquely applicable in OFDMA PONs with abundance subchannels. The advantageous properties of the protocol further leverage the advantages of OFDMA PON as compared to TDM PON and WDM PONs.

Figure 2:
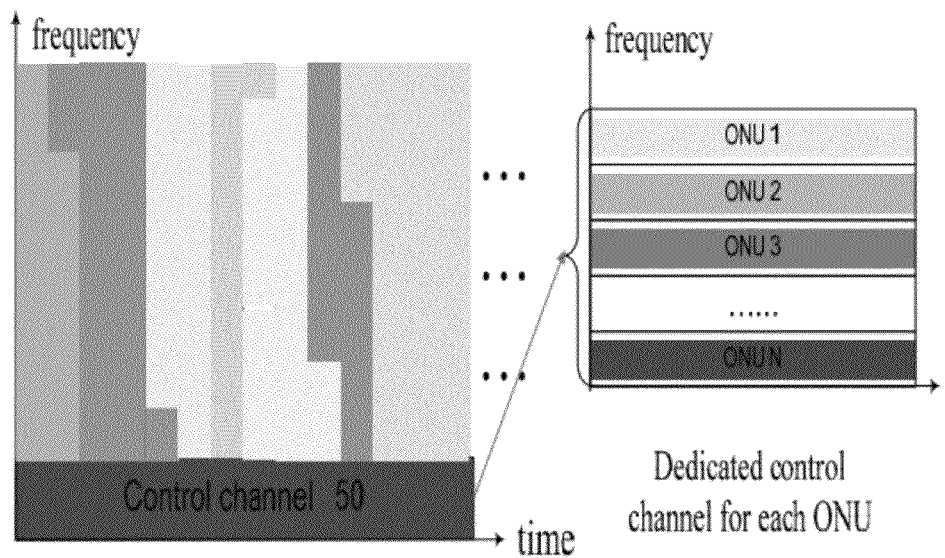
FIG. 2 illustrates an exemplary PON architecture with control channels.
Figure 3:
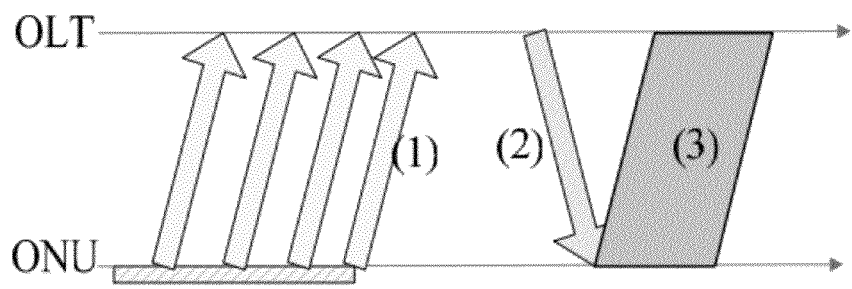
FIG. 3 shows an exemplary MAC control schemes in OFDMA PON.

FIG. 2 illustrates an exemplary PON architecture with control channels 50. FIG. 2 shows that a number of subcarriers are dedicated for control message transmission and the other subcarriers are shared by all ONUs 1-N. FIG. 3 shows that ONUs can keep updating their queue status to OLT using its control channel, and OLT sends out the grant to ONUs just before the allocation time begins. In this embodiment, RTTi ($\forall$i) is known to OLT during the ONU registration process.

The protocol separates control channel from data channel. By dedicating each ONU with one control channel, the control message can be transmitted any time without constraints. The protocol also sends out the grant message to an ONU just before the allocated time is about to start. Then, an ONU can send out its data traffic immediately after receiving the grant message without synchronizing with the OLT clock.

In one embodiment, each ONU is dedicated with one or more upstream/downstream OFDMA subcarrier for its control message transmission. By using dedicated subcarriers for control message transmission, each ONU keeps updating its queue information to OLT such that OLT can own the latest queue information of ONUs. All the other OFDMA subcarriers except those dedicated for control message transmission are shared among all ONUs. OLT sends out grant messages to an ONU just before the allocated time duration to the ONU is about to begin, and an ONU begins its data traffic transmission immediately after receiving the grant message.

The system of FIG. 2 exhibits three main advantages. First, with dedicated upstream control subcarriers for each ONU, an ONU can update its latest queue status to OLT and make sure OLT get the most recent queue information. Second, with the dedicated downstream control subcarriers, OLT can send the grant just before the allocated time begins such that ONUs can begin transmission immediately after receiving grants without synchronizing with the OLT clock. Third, all the other OFDM subcarriers besides control subcarriers are shared by ONUs, thus facilitating the exploration of the statistical multiplexing gain.

To eliminate the synchronization need and also exploit the traffic statistical gain, one embodiment of a MAC control protocol contains the following:

In order to exploit the statistical multiplexing gain, the report/grant control mechanism is employed. That is to say, ONUs report their traffic information to OLT, and OLT allocates subcarriers to ONUs based on the real-time ONU reports.

Each ONU is dedicated with some upstream/downstream OFDMA subcarriers. However, these dedicated OFDMA subcarriers are used for control message transmission only.

OLT sends out the grant message to an ONU just before the allocated time begins, i.e., the grant is sent out at time $t_i$ RTT$_i$, where t is the beginning time of the allocation to ONU i, and RTT$_i$ refers to the round trip time between OLT and ONU i. The grant message contains the allocated subcarriers and the time duration on each allocated subcarriers.

Upon receiving grants sent from OLT, an ONU immediately starts its data transmission on the allocated subcarriers for the time duration specified in the grant message.

The system eliminates the synchronization needs of ONUs while exploiting the traffic statistical multiplexing gain by taking advantage of the abundance of OFDMA subcarriers. In OFDMA PON, OFDMA is used as the network modulation and access scheme. The system divides the upstream/downstream bandwidth in baseband into multiple subcarriers with orthogonal frequencies. These subcarriers are dynamically allocated to different ONUs based on their real-time incoming traffic information. To eliminate the synchronization needs of ONUs, the following is done:

1) Each ONU is dedicated with one or more upstream/downstream subcarriers for the transmission of control messages only. By using the dedicated control channel, ONUs can report to OLT any time the traffic arrives, and OLT can send grant messages to ONUs at any time.

2) OLT sends out grant messages to an ONU just before the transmission of the ONU begins, and an ONU begins data transmission immediately after receiving grant control message instead of transmitting at the time stamp specified in the grant message. With this scheme, ONUs do not need to maintain synchronization with the OLT clock.

FIG. 3 shows that ONUs can keep updating their queue status to OLT using its dedicated upstream control channel, and OLT sends out the grant to an ONU just before the allocation time begins. An ONU begins its data transmission immediately after receiving the grant message sent from OLT. RTTi(8i) is known to OLT during the ONU registration process. Then, OLT can derive the time that the grant should be sent.

Next, the packet delay and throughput performances produced by the MAC control scheme are simulated. In this simulation, the PON supports 32 ONUs, and ONUs are 20 km away from OLT. RTTi, $\forall$i is set as 0.2 ms. The upstream/downstream data rate is set as 10 Gb/s, and 2048 OFDMA subcarriers are tested, among which each ONU is dedicated with one subcarrier for control message transmission. Then, each ONU is allocated with 4.88 Mb/s upstream/downstream bandwidth for control traffic, and an ONU can update its queue information every 10.5 µs if the length of the report message equals to 64 bytes. For the ONU traffic, a finite time horizon with the time duration of 8 seconds is chosen. The traffic of an ONU arrives in bursts, and the burst size obeys Pareto distribution with the Pareto index $\alpha=1.4$ and the mean equals to 31.25 k bytes, which takes about 25 µs to transmit if all OFDMA subcarriers except those dedicating for control messages are allocated to it. The burst inter-arrival time also obeys the Pareto distribution with $\alpha=1.4$. The mean is varied to produce different network traffic loads.

Figure 4A:
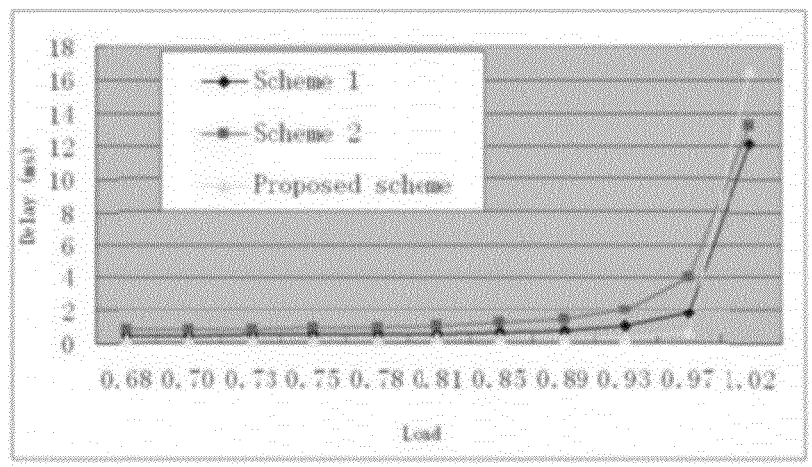
FIGS. 4A-4B shows exemplary performance graph under various control schemes.

FIG. 4A compares the delay performance produced by the three MAC control schemes. Traffic load is defined as the ratio between the total arrival traffic over the network capacity. In Scheme 2, each ONU is fixedly assigned with 2048/32=64 subcarriers for their data transmission. In the other two schemes, all subcarriers except those dedicating for control messages are allocated to the same ONU at a time. Thus, Scheme 2 produces longer packet transmission delay as compared to the other two schemes. When the network is lightly loaded, the transmission delay dominates the overall delay, and hence Scheme 2 yields the largest delay among the three schemes under this traffic condition. Besides, in our proposed scheme, traffic arrival can be immediately reported to OLT while the incoming traffic has to wait for some time before being reported in Scheme 2. Thus, when the network is lightly loaded that queuing delay is negligible, our proposed scheme yields smaller delay than Scheme 2. FIG. 4A shows that the proposed scheme produces the smallest delay when the network load is as large as 0.97. When the network is heavily loaded (load>0.97 as shown in FIG. 4A), the proposed scheme results in the largest delay because of the large queuing delay resulted by reduced number of subcarriers for data transmission.

Figure 4B:
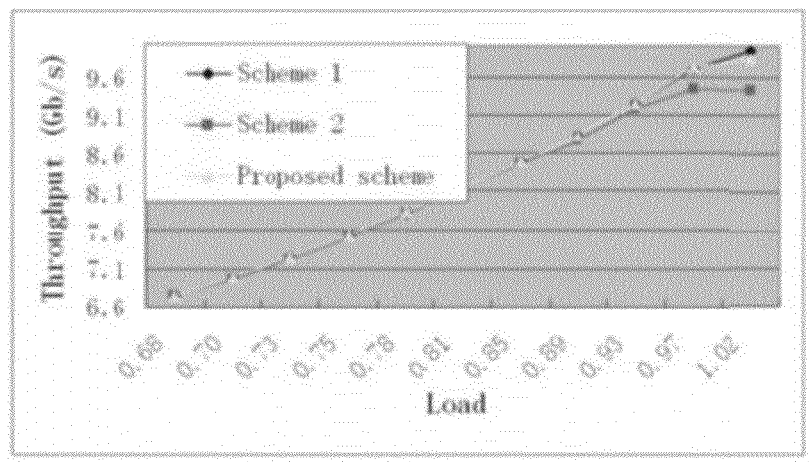

FIG. 4B compares the throughput performance of the three schemes. When load<0.93, throughput of the three schemes are similar, which equals to the arrival traffic rate; when load>0.93, throughput of Scheme 2 is the smallest because of the failure of exploiting the statistical multiplexing gain, and throughput of our proposed scheme is slightly smaller than that of Scheme 1 because 32 OFDMA subcarriers are dedicated for control message transmission.

In sum, an efficient MAC control protocol for OFDMA PON is disclosed that exploits the abundance of OFDMA subcarriers. With the preferred embodiment, packet delay is reduced since the ONU traffic can be immediately reported to ONU upon arrival; traffic statistical multiplexing gain is exploited since OFDMA subcarriers are dynamically assigned to ONUs according to their real-time traffic. More importantly, the synchronization need is eliminated at ONU side, thus simplifying the ONU constitution and reducing the ONU cost.

What is claimed is:

1. A method for providing media access control (MAC) in an optical network, comprising:
   providing a separate control channel and data channel;
   dedicating each optical network unit (ONU) with one control channel, wherein the control message is transmitted at any time without constraints;
   sending a grant message to an ONU just before an allocated time is about to start; and
   sending data traffic from the ONU immediately after receiving the grant message without synchronizing with an optical line terminal (OLT) clock.

2. The method of claim 1, comprising providing one or more upstream/downstream subcarriers for a transmission of control messages only.

3. The method of claim 1, comprising using the dedicated control channel, each ONU reports to the OLT any time a traffic arrives, and the OLT can send grant messages to the ONUs at any time.

4. The method of claim 1, wherein the OLT sends out grant messages to an ONU just before a transmission of one of the ONUs begins.

5. The method of claim 1, wherein the ONU begins data transmission immediately after receiving a grant control message instead of transmitting at a time stamp specified in the grant message.

6. The method of claim 1, wherein the ONUs report traffic information to the OLT, and the OLT allocates subcarriers to the ONUs based on real-time ONU reports.

7. The method of claim 1, wherein each ONU is dedicated with a predetermined set of upstream/downstream OFDMA subcarriers.

8. The method of claim 1, wherein the OLT sends out a grant message to an ONU just before an allocated time begins.

9. The method of claim 8, comprising sending the grant at time $t_i$ $RTT_i$, where t is the beginning time of the allocation to ONU i, and $RTT_i$ refers to a round trip time between OLT and ONU i.

10. The method of claim 8, wherein the grant message contains allocated subcarriers and a time duration on each allocated subcarriers.

11. An optical communication system, comprising
   a. an optical line terminal (OLT);
   b. at least one optical network unit (ONU) with one control channel, wherein the control message is transmitted at any time without constraints;
   c. a splitter coupling the OLT to the ONUs; and
   d. a media access control protocol controller to send a grant message to an ONU just before an allocated time is about to start, wherein the ONU sends data upon receiving the grant message without synchronizing with an optical line terminal (OLT) clock.

12. The system of claim 11, wherein each ONU is dedicated with one or more upstream/downstream OFDMA subcarrier for its control message transmission.

13. The system of claim 11, wherein each ONU keeps updating its queue information to OLT such that OLT can own the latest queue information of ONUs.

14. The system of claim 11, wherein all OFDMA subcarriers except those dedicated for control message transmission are shared among all ONUs.

15. The system of claim 11, wherein the OLT sends grant messages to an ONU just before an allocated time duration to the ONU is about to begin, and an ONU begins data traffic transmission immediately after receiving the grant message.

16. The system of claim 11, wherein upon receiving grants sent from the OLT, the ONU starts data transmission on allocated subcarriers for a time duration specified in the grant message.

17. The system of claim 11, wherein the ONU begins data transmission immediately after receiving a grant control message instead of transmitting at a time stamp specified in the grant message.

18. The system of claim 11, wherein the OLT sends a grant at time $t_i$ $RTT_i$, where t is the beginning time of the allocation to ONU i, and $RTT_i$ refers to a round trip time between OLT and ONU i.

19. The system of claim 18, wherein the grant message contains allocated subcarriers and a time duration on each allocated subcarriers.

20. The system of claim 11, wherein the ONUs report traffic information to the OLT, and the OLT allocates subcarriers to the ONUs based on real-time ONU reports.

* * * * *